June 6, 1944.  M. J. SCANLON  2,350,478
MOTOR VEHICLE STEERING GEAR
Filed May 19, 1943   2 Sheets-Sheet 1
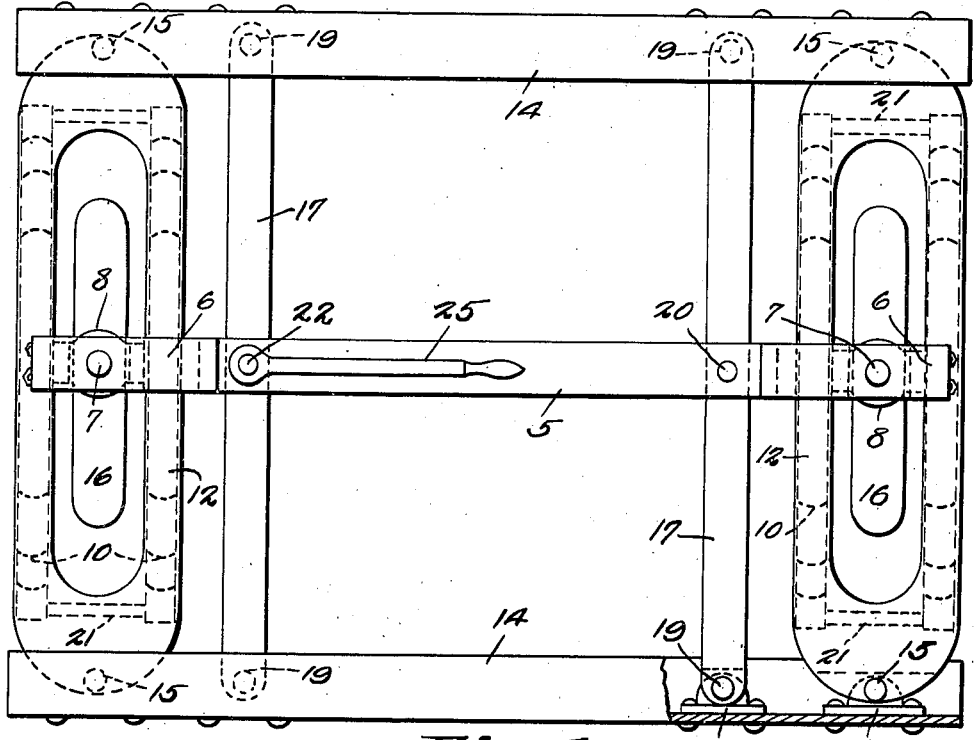
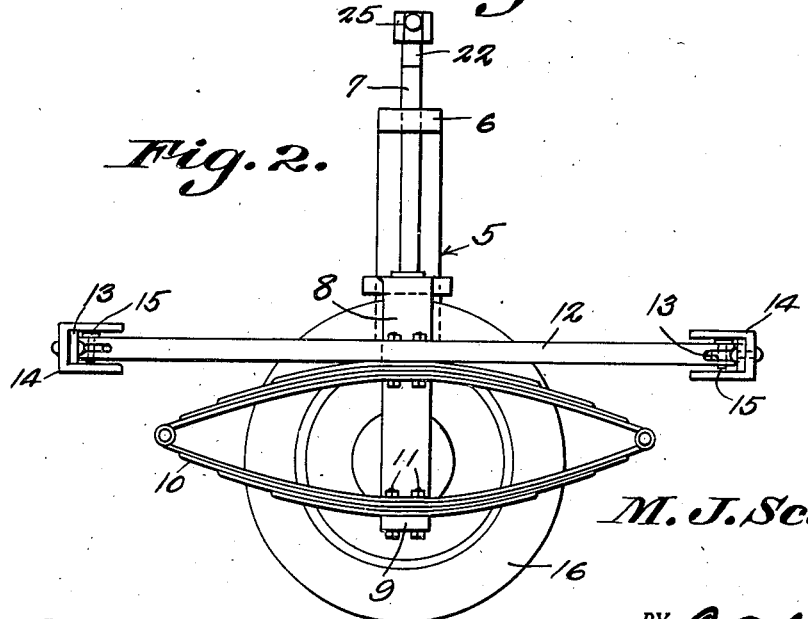
M. J. Scanlon
INVENTOR.
BY
ATTORNEYS June 6, 1944.  M. J. SCANLON  2,350,478
MOTOR VEHICLE STEERING GEAR
Filed May 19, 1943    2 Sheets-Sheet 2

M. J. Scanlon
INVENTOR.

BY A. A. Knowles
ATTORNEYS

Patented June 6, 1944

2,350,478

UNITED STATES PATENT OFFICE 2,350,478

MOTOR VEHICLE STEERING GEAR

Michael Joseph Scanlon, Baltimore, Md.

Application May 19, 1943, Serial No. 487,623

5 Claims. (Cl. 280—87)

This invention relates to motor vehicle steering gear construction, the primary object of the invention being to provide a steering gear which will be exceptionally rigid, and one wherein the steering column and steering wheel, will be free of vibrations and twisting, usually caused by the vehicle passing over rough and irregular road surfaces, thereby reducing wear on the bearings of the steering gear to the minimum, and at the same time rendering the steering of the vehicle, exceptionally easy.

Another object of the invention is to provide a vehicle steering gear which will stabilize the load, reducing side-sway, caused when the vehicle rounds a curve, or negotiates a sharp, quick turn.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings

Figure 1 is a plan view of the front steering gear frame of a motor vehicle, constructed in accordance with the invention.

Figure 2 is an end elevational view thereof.

Figure 3:
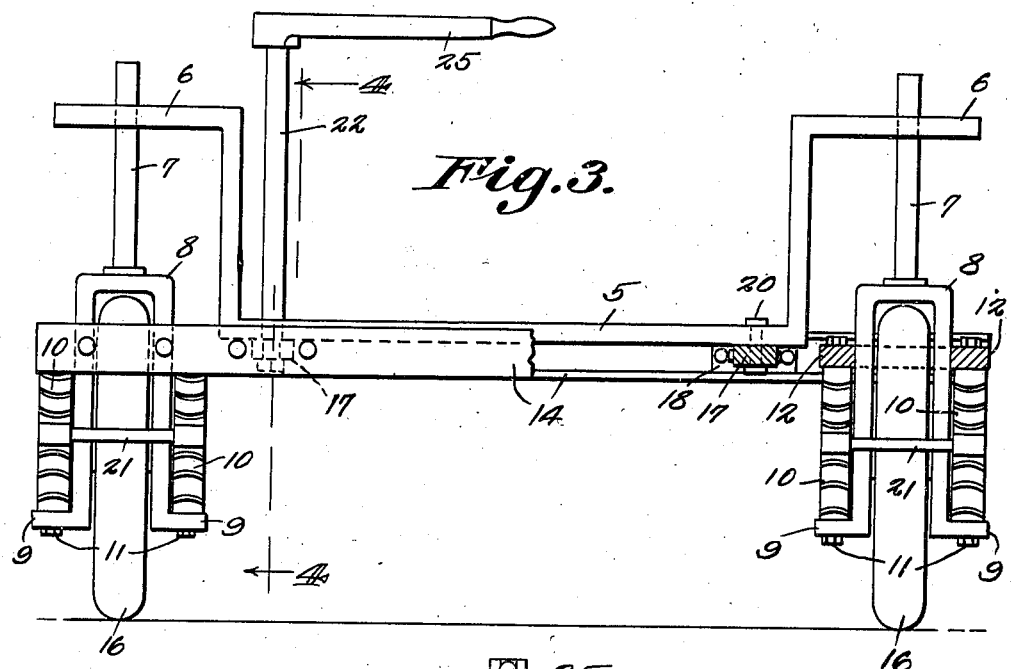
Figure 3 is a front elevational view thereof.
Figure 4:
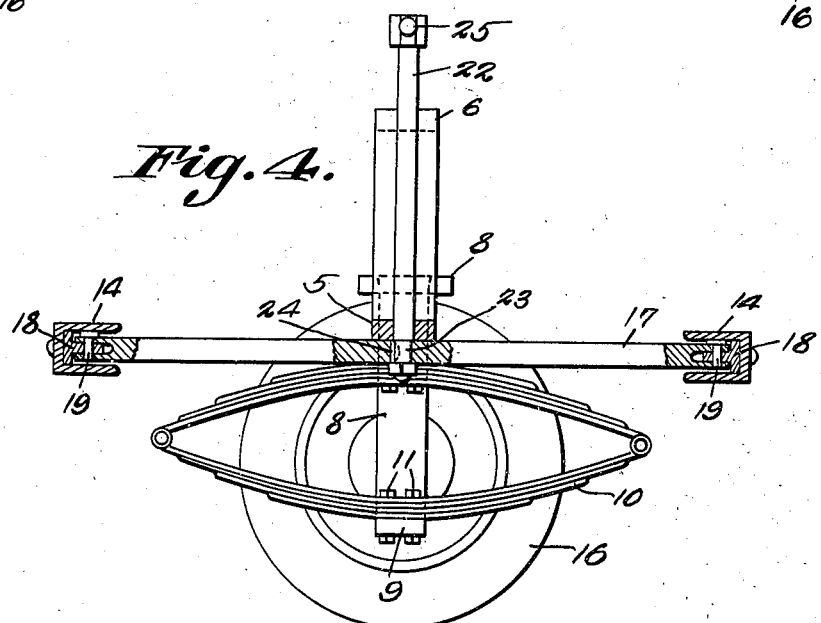
Figure 4 is a sectional view taken on line 4—4 of Fig. 3.

Referring to the drawings in detail, the reference character 5 desigantes the rigid cross-member of the steering gear frame. This cross-member 5 is substantially U-shaped, and has laterally extended end portions 6 formed with openings for the reception of the vertical shafts 7 that are connected to the wheel forks 8 in supporting the wheels in upright positions.

These forks 8 are formed with laterally extended end portions 9 that form seats for the lower leaves of the elliptical springs 10, which are shown as bolted thereto, by means of the bolts 11.

These springs 10 have the upper leaves thereof bolted to the end members 12 of the steering gear frame.

The end members 12 have their ends formed with recesses to receive the brackets 13 that are bolted within the channel bars 14, forming the cross-members of the frame, the end members 12 being connected with the brackets 13, by means of the pivot pins 15. As clearly shown by the drawings, the forks 8 extend through elongated openings in the end members 12, and are so fitted within the openings, that the forks together with the wheels 16, which are mounted on spindles secured to the forks, may move vertically with respect to the steering gear frame, to the end that road shocks directed to the steering gear, will be taken up through the elliptical springs, eliminating vibrations at the steering column, usually caused by sudden road shocks.

The reference character 17 designates brace members which also have recesses formed in their ends to accommodate brackets 18 that are secured within the channel bars or cross-members 14, there being provided pivot pins 19 for connecting the brace members to the brackets. These brace members 17 are also pivotally connected to the rigid cross-member 5, by means of the pivot pin 20.

It might be further stated that the front and rear ends of the elliptical springs 10, are connected by the rods 21, which hold the springs 10 at opposite sides of the wheel forks, in proper spaced relation with respect to each other at all times, eliminating twisting of one spring with respect to the other, under unusual strain directed to the steering gear.

The steering post, which is indicated by the reference character 22, extends through an opening in the rigid cross-member 5, at a point directly over one of the brace members 17, and is provided with a reduced portion 23, that is rigidly secured to the brace bar 17 directly thereunder, a key 24 being provided for preventing relative movement between the two members. A steering handle such as indicated at 25 is secured to one end of the steering post 22, so that by rotating the handle, the steering post may be rotated to swing the steering gear frame to the right or left, according to the direction of rotation of the steering handle.

It will of course be understood that in the construction of a motor vehicle, the construction of the rigid cross-member may be changed to meet various requirements, without altering the principles of operation of the invention.

When the steering post is moved to the right or left, it is obvious that the cross-members 14 are displaced laterally in opposite directions and the end members 12 and brace members 17 oscillate on their pivots to the right or left, moving the wheels 16, to accomplish the steering of the vehicle.

Due to this construction, it will be seen that the steering post or steering gear mechanism will not be influenced by road shocks, to the end that the steering handle will be practically vibrationless.

What is claimed is:

1. Motor vehicle steering gear, comprising a frame embodying parallel front and rear members, end members pivotally connected with the front and rear members, adjacent to the ends thereof, said end members having elongated openings, a rigid cross-bar, the ends of the cross-bar being extended laterally and having openings, motor vehicle wheel forks embodying vertical shafts, extending through the elongated openings, springs mounted between the forks and end members, and adapted to regulate the vertical movement of said wheel forks, brace bars pivotally connected with the front and rear members, and means for moving the brace bars to accomplish the steering of the vehicle wheels.

2. Motor vehicle steering gear, comprising a front frame embodying parallel front and rear members, end members, said end members being pivotally connected with the front and rear members, said end members having elongated openings, wheel forks mounted within the elongated openings, said wheel forks having right-angled ends, wheels mounted within said forks, elliptical springs mounted between the right-angled ends of the forks and the end members, a rigid cross-member secured to the frame, the ends of the cross-member extending laterally over the forks, and having openings, vertical shafts on the forks, said shafts being disposed in the openings, and means for moving the members of the frame.

3. Motor vehicle steering gear, comprising parallel front and rear members, end members pivotally connected between the front and rear members, said end members having elongated openings, brace bars pivotally connected with the front and rear bars and being disposed adjacent to the end members, wheel forks mounted within the elongated openings, elliptical springs connected with the forks and end members and adapted to cushion vertical movement of the forks, a rigid cross-member pivotally connected with said brace bars and having openings, and vertical shafts rising from the forks and being disposed within the openings of the cross-members.

4. Motor vehicle steering gear comprising parallel front and rear members, end members pivotally connected with the front and rear members at the ends thereof, said end members having elongated openings, wheel forks extending through the elongated openings, wheels mounted on the forks, shafts rising vertically from the forks, a rigid cross-member secured to the frame and to which a motor vehicle frame is secured, said cross-member having openings in which the vertical shafts are mounted, elliptical spring members mounted at opposite sides of the forks and being connected with the forks and frame, rods connecting the ends of the springs of each fork, said members of the frame adapted to pivot with respect to each other.

5. Motor vehicle steering gear, comprising parallel front and rear members, end members pivotally connected between the front and rear members, said end members having elongated openings, brace bars connecting the front and rear bars, a rigid cross-bar pivotally connected with the brace bars, the ends of the cross-bar overlying the end members in spaced relation therewith and having openings, wheel forks mounted within the elongated openings, shafts extending from the wheel forks and operating within the openings of the end members, the lower ends of said forks extending laterally, pairs of elliptical springs resting on the laterally extending ends of the forks and being connected with said end members yieldingly mounting the forks, and means for moving the bars of the frame with respect to each other, to accomplish the steering of the vehicle.

MICHAEL JOSEPH SCANLON.